(12) United States Patent
Myers

(10) Patent No.: US 6,979,997 B1
(45) Date of Patent: Dec. 27, 2005

(54) METHOD OF CONTROLLING THE OPERATION OF A DIGITAL STATE MACHINE FROM A MASTER CONTROLLER IN AN IC-CHIP TESTING SYSTEM

(75) Inventor: Nicholas Tyson Myers, Chandler, AZ (US)

(73) Assignee: Unisys Corporation, Blue Bell, PA (US)

( * ) Notice: Subject to any disclaimer, the term of this patent is extended or adjusted under 35 U.S.C. 154(b) by 15 days.

(21) Appl. No.: 10/850,281

(22) Filed: May 19, 2004

(51) Int. Cl.[7] ............................................. G01R 31/02
(52) U.S. Cl. .................................... 324/158.1; 324/754
(58) Field of Search ............................. 324/158.1, 754, 324/756, 760, 765; 165/61–66, 80; 361/688, 361/696; 439/482, 259

(56) References Cited

U.S. PATENT DOCUMENTS

| | | | | |
|---|---|---|---|---|
| 4,841,231 A | * | 6/1989 | Angelucci ................... | 324/528 |
| 5,818,247 A | * | 10/1998 | Pyun ......................... | 324/756 |
| 6,307,388 B1 | * | 10/2001 | Friedrich et al. ........... | 324/754 |
| 6,307,391 B1 | * | 10/2001 | Tustaniwskyj et al. ..... | 324/760 |
| 6,325,662 B1 | * | 12/2001 | Tustaniwskyj .............. | 324/754 |
| 6,522,156 B2 | * | 2/2003 | Tustaniwskyj et al. ..... | 324/754 |
| 6,587,884 B1 | * | 7/2003 | Papadopoulos et al. ..... | 709/230 |
| 6,909,299 B1 | * | 6/2005 | Siade et al. ................ | 324/755 |
| 6,919,718 B2 | * | 7/2005 | Siade et al. .............. | 324/158.1 |

* cited by examiner

Primary Examiner—Jermele Hollington
(74) Attorney, Agent, or Firm—Charles J. Fassbender; Mark T. Starr; Lise A. Rode

(57) ABSTRACT

An IC-chip testing system includes multiple digital state machines, and a master controller which controls the operation of those digital state machines by a particular method. In this method, the master controller first generates a command chain in which multiple commands for one particular digital state machine are concatenated together in a series. Thereafter, the master controller sends a single payload data packet embedded in a layered TCP/IP/network format, to that digital state machine. This single payload data packet includes the entire command chain. By concatenating many commands together in the command chain, the adverse effect of TCP/IP/network headers on the efficiency of transmission is overcome. In one particular transmission, efficiency is increased from 7.1% for sending a single command, to 89.4% for sending the entire command chain.

10 Claims, 8 Drawing Sheets eq. 1 ~ COMMAND CHAIN = 5 COMMANDS eq. 2 ~ AVERAGE COMMAND = 6 BYTES eq. 3 ~ TCP HEADER = 20 BYTES
IP HEADER = 20 BYTES
ETHERNET = 14 BYTES eq. 4 ~ FIG. 3 EFFICIENCY = $\dfrac{(6)(5)}{20 + 20 + 14 + (6)(5)}$ = 35.7 %

*Figure 6A* eq. 10 ~ AVERAGE PAD PER COMMAND = 64 − 6 − 20 − 20 − 14 = 4 eq. 11 ~ FIG. 5 EFFICIENCY = $\dfrac{(6)}{(6 + 4 + 20 + 20 + 14)}$ = 9.4 %

*Figure 6B* eq. 20 ~ COMMAND CHAIN = 10 COMMANDS eq. 21 ~ FIG. 3 EFFICIENCY = $\dfrac{(6)(10)}{20 + 20 + 14 + (6)(10)}$ = 52.6 % eq. 22 ~ COMMAND CHAIN = 30 COMMANDS eq. 23 ~ FIG. 3 EFFICIENCY = $\dfrac{(6)(30)}{20 + 20 + 14 + (6)(30)}$ = 76.9 %

*Figure 6C* eq. 30 ~ LET COMMAND CHAIN = 10 REPETITIONS OF FIG. 7 COMMANDS $$\text{eq. 31} \sim \text{FIG. 3 EFFICIENCY} = \frac{(23)(10)}{20 + 20 + 14 + (23)(10)} = 80.9\,\%$$

eq. 32 ~ LET COMMAND CHAIN = 20 REPETITIONS OF FIG. 7 COMMANDS $$\text{eq. 33} \sim \text{FIG. 3 EFFICIENCY} = \frac{(23)(20)}{20 + 20 + 14 + (23)(20)} = 89.4\,\%$$

Figure 8A $$\text{eq. 41} \sim \text{AVERAGE COMMAND} = \frac{23}{5} = 4.6 \text{ BYTES}$$

eq. 42 ~ AVERAGE PAD PER COMMAND = 64 − 4.6 − 20 − 20 − 14 = 5.4 BYTES $$\text{eq. 43} \sim \text{FIG. 5 EFFICIENCY} = \frac{4.6}{20 + 20 + 14 + 4.6 + 5.4} = 7.1\,\%$$

Figure 8B

METHOD OF CONTROLLING THE OPERATION OF A DIGITAL STATE MACHINE FROM A MASTER CONTROLLER IN AN IC-CHIP TESTING SYSTEM

BACKGROUND OF THE INVENTION

The present invention relates to methods of controlling the operation of a digital state machine from a master controller in an IC-chip testing system.

A single IC-chip (integrated circuit chip) can contain over one-million transistors, and those transistors must be tested before the IC-chip is sold to a customer. Usually, each IC-chip is incorporated into an integrated circuit module (IC-module) before it is tested. In one type of IC-module, the IC-chip is attached to a substrate and covered with a lid. Alternatively, the lid may be left off of the IC-module. In either case, electrical terminals are provided on the substrate which are connected by microscopic conductors in the substrate to the IC-chip.

To test the IC-chips, the complex '524 system (which is referenced under "RELATED CASES") has been developed. FIG. 1 of the '524 application shows that the '524 system is comprised of several modules 21–24, 31–34, 41–44, 40, 50, 60, 70 and 80. The present invention controls the operation of four digital state machines, a respective one of which is in each of the modules 21–24, from a master controller which is module 70. Thus, for convenience, FIG. 1 from the '524 application is reproduced herein as FIG. 1. Also, TABLE 1 from the '524 application, which describes all of the FIG. 1 modules, is reproduced below.

TABLE 1

| MODULE | DESCRIPTION |
| --- | --- |
| 21 | Module 21 is a combination of three subassemblies which each perform particular functions. One subassembly holds a group of IC-chips which are to be tested. The second subassembly supplies electrical power to the above group of IC-chips while they are tested. The third subassembly sends test signals to the above group of IC-chips while they are tested. One structure for module 21 is shown in detail in FIG. 5, (which is described later). |
| 22, 23, 24 | Each of the modules 22, 23, and 24 perform the same functions, and have the same structure, as module 21. The modules 21–24 operate independently of each other. |
| 31 | Module 31 is a moving mechanism which automatically moves module 21 horizontally within system 10 from a load position to a test position, and visa-versa. In FIG. 1, module 21 is shown at the load position. |
| 32, 33, 34 | Modules 32, 33, and 34 are respective moving mechanisms for the modules 22, 23, and 24. Each moving mechanism operates independently to move one of the modules 22–24 horizontally within the system 10 from the load position to the test position, and visa-versa. One structure for the moving mechanisms 31–34 is shown in FIGS. 2 and 4, (which are described later). |
| 41 | Module 41 is a temperature control module for the group of IC-chips that are held by module 21. This temperature control module 41 moves vertically within the system 10 to contact the group of IC-chips that are held by module 21 when that module is in the test position. The structure of the temperature control module 41 is shown in FIGS. 2 and 6 (which are described later). |
| 42, 43, 44 | Modules 42, 43, and 44 are respective temperature control modules for the modules 22, 23, and 24. Each temperature control module moves vertically within the system 10 independently of the other temperature control modules. |
| 40 | Module 40 is a temperature control center which is shared by all of the temperature control modules 41–44. One function which the temperature control center 40 performs is to circulate a liquid coolant through each of the temperature control modules 41–44. Another function which the temperature control center 40 performs is to send control signals to each of the modules 41–44 which enable these modules to regulate the temperature of the IC-chips that they contact. |
| 50 | Module 50 is a container placing mechanism which places several different types of containers, for the IC-modules, at predetermined locations below the load position of the modules 21–24. These containers include "source" containers which hold IC-chips that need to be loaded into the modules 21–24 so they can be tested, "pass" containers which hold IC-chips that have been tested and passed the test, and "fail" containers which hold IC-chips that have been tested and failed the test. The structure of the container placing |

TABLE 1-continued

| MODULE | DESCRIPTION |
| --- | --- |
|  | mechanism is shown in FIGS. 3A–3B (which is described later). |
| 60 | Module 60 is a chip handler mechanism which automatically takes IC-modules from the source containers in module 50 and places them in each of the modules 21–24. Also, module 60 automatically takes IC-modules from each of the modules 21–24 and places them in a pass container or a fail container within module 60. The structure of the chip handler mechanism is shown in FIG. 2 (which is described later). |
| 70 | Module 70 is a master controller for the entire system 10. One function which the master controller 70 performs is to separately direct each one of the modules 21–24 when to start sending test signals to the IC-chips which those modules hold. Another function which the master controller 70 performs is to direct the chip handler mechanism 60 when the start loading IC-chips into a particular one of the modules 21–24, and when to start unloading IC-chips from those modules. Those operations are shown in FIGS. 7A and 7B, and are described in conjunction with those figures. |
| 80 | Module 80 is a human interface to the system 10. This human interface includes a microprocessor 81, a computer monitor 82, a computer keyboard 83, and a mouse 84. The microprocessor 81 is coupled via a communication channel 85 to the master controller 70. |

Additional details of module 21 and the master controller 70 are shown in FIG. 2. There, module 21 is shown as including components 21A–21L. Nodules 22–24 have the same structure as module 21.

Component 21I in each of the modules 21–24 is a digital state machine. All of those digital state machines 21I are coupled to the master controller 70 by an ethernet, as shown. The master controller 70 and the digital state machines 21I interact over the ethernet by a novel method which is the gist of the present invention. However, before proceeding with the details of that method, the remaining components which are in each of the modules 21–24 will be briefly described.

Component 21A is a printed circuit board. This printed circuit board 21A lies in a horizontal plane within module 21. In FIG. 2, a side view of the printed circuit board 21A in the horizontal plane is shown, and the printed circuit board 21A extends perpendicularly into the figure.

Each of the components 21B is a socket that is mounted on the downward facing surface of the printed circuit board 21A. In one particular embodiment, a total of thirty-two sockets 21B are mounted on the printed circuit board 21A. However, the total number sockets 21B on the printed circuit board 21A is a design choice.

Each of the components 21C–21E together constitute one IC-module. Component 21C is a substrate within the IC-module; component 21D is an IC-chip that is attached to one surface of the substrate 21C; and component 21E is a set of terminals that extend from an opposite surface of the substrate 21C. The IC-modules are inserted into the sockets 21B, and are removed therefrom, by the chip-handler mechanism 60 that is shown in FIG. 1.

Each of the components 21F is a springy electrical contact on the upward facing surface of the printed circuit board 21A. These contacts 21F are electrically connected to the IC-chips 21D by the conductors that run through the printed circuit board 21A, the sockets 21B, and the substrates 21C.

Some illustrative examples of the conductors in the printed circuit board 21A are shown in FIG. 2 by dashed lines. The symbol "+V" next to the dashed line indicates that the corresponding conductor carries electrical power at a constant voltage +V to the IC-chip 21D. The symbols "TDI, CK" next to a dashed line indicates that the corresponding conductors carry "TEST DATA IN" signals and "CLOCK" signals to an IC-chip 21D. The symbol "TDO" next to a dashed line indicates that the corresponding conductor carries "TEST DATA OUT" signals from the IC-chip 21D. The symbol "T" next to a dashed line indicates that the corresponding conductor carries a signal from a temperature sensor on one IC-chip 21D which measures the chips' temperature.

Component 21G is another printed circuit board. This printed circuit board 21G is attached to the printed circuit board 21A by bolts 21L and nuts 21K, as shown. The printed circuit board 21G includes electrical conductors which connect to the spring electrical contacts 21F, and some illustrative examples of those conductors are shown in FIG. 2 by dashed lines.

Each of the components 21H is a DC—DC converter that is mounted on the upward facing surface of the printed circuit board 21G. In the FIG. 2 embodiment, one separate DC—DC converter 21H is provided for each IC-chip 21D. These DC—DC converters 21H receive electrical power at an input voltage $V_{in}$ from a power cable (not shown), and they produce electrical power at the voltage +V which is sent to the IC-chips 21D.

Component 21J is an electrical connector. This connector 21J receives a respective temperature signal T from each of the IC-chips 21D that are held by the sockets 21B. All of the temperature signals T are sent on a cable (not shown) from the socket 21J to the temperature control center 40 in FIG. 1.

In operation, the digital state machine 21I in each of the modules 21–24 performs various functions which are controlled by commands from the master controller 70. For example, one type of command directs the digital state machine to store a particular TDI bit pattern in an internal memory. A second type of command directs the digital state machine 21I to send a stored TDI bit pattern to the IC-chips 21C as a serial stream of bits. A third type of command directs the digital state machine 21I to send each "1" in the TDI bit stream at a particular voltage level. A fourth type of command directs the digital state machine 21I to send the TDI bit stream at a particular frequency.

To completely test the IC-chips 21D, the master controller 70 needs to send dozens of different type of commands to the digital state machine 21I. Further, these commands need to be sent in various sequences which may contain over one-hundred commands.

Now in the prior art, one common method of communicating via an ethernet between two personal computers is known as "TCP/IP over ethernet". The TCP/IP protocol is defined in terms by an "Internet Reference Model" which is a stack that has four layers. In this stack, the top layer is the "application layer"; the next layer is the "transport layer"; the next layer is the "internet layer"; and the bottom layer is the "network layer".

The transport layer operates in accordance with a "Transmission Control Protocol" (TCP) which is defined in a standard called RFC703. The internet layer operates in accordance with an "Internet Protocol" (IP) which is defined in a standard called RFC791. The network layer can, as one option, operate in accordance with the ethernet protocol which is defined by a standard called IEEE802.3.

By comparison, the structure and operation of the application layer is not defined by any standards. This is advantageous because it allows TCP/IP over ethernet to be implemented in a wide variety of applications.

However, the present inventor has discovered that when TCP/IP over ethernet is used to send commands in the application layer from the master controller 70 to the digital state machine 21I in the IC-chip testing system of FIGS. 1 and 2, the operation of the TCP/IP/ethernet layers can greatly effect the efficiency with which those commands are sent. In two specific numeral examples, which are described later herein in conjunction with FIGS. 6B and 8B, that efficiency of transmission respectively is just 9.4%, and 7.1%.

Accordingly, a primary object of the present invention is to provide a novel solution to the above efficiency problem.

BRIEF SUMMARY OF THE INVENTION

The invention which is claimed herein is a method of controlling the operation of a digital state machine from a master controller in an IC-chip testing system. In one particular embodiment of this method, commands are sent from the master controller to the digital state machine, in a layered TCP/IP/ethernet format, with a high degree of efficiency. Specific examples of this embodiment are described herein, in conjunction with FIGS. 6A, 6C, and 8A; and there, the commands are sent with efficiencies of 35.7%, 52%, 76.9%, 80.9%, and 89.4% respectively.

In the above embodiment, the master controller first generates a command chain in which multiple commands for the digital state machine are concatenated together in a series. Thereafter, the master controller sends a single payload data packet embedded in a layered TCP/IP/ethernet format, to the digital state machine. This single payload data packet includes the entire command chain. Subsequently, the digital state machine executes the commands in the command chain.

When the payload data packet is embedded in the layered TCP/IP/ethernet format, an ethernet header and IP header and a TCP header are all appended to the data packet in accordance with the IEEE802.3/RFC791/RFC703 standards. The presence of those headers decrease the efficiency with which the payload data packet is sent. However, by concatenating many commands together in a chain and thereby making the payload data packet long, the adverse effect of the headers on the efficiency is overcome. In FIG. 8A, the efficiency of sending one particular command chain is 89.4%, whereas the efficiency of sending just one average command in that chain is only 7.1%.

In addition to improved efficiency, the method which is claimed herein has the additional benefit of setting the master controller free to perform other tasks, while the digital state machine is executing the commands in the long command chain. This is important where the master controller is controlling multiple digital state machines simultaneously. By comparison, if only one command is sent at a time, the master controller must always be ready to receive a response from the digital state machine and/or send the next command.

Another benefit with the method that is claimed herein is that the digital state machine is able to execute the commands that it receives in the chain without any delay between two consecutive commands. This is important where consecutive commands must be completed in a certain time interval.

A third additional benefit with the method that is claimed herein is that the command chain which is sent to the digital state machine can include one or more conditional branch instructions. Consequently, the master controller can direct the digital state machine to selectively branch from one command to any other command in the command chain, based on the state of certain conditions. By comparison, if the digital state machine receives and executes only one command at a time, there is no other command to branch to.

BRIEF DESCRIPTION OF THE DRAWINGS

FIG. 6A shows a set of equations that calculate the efficiency by which commands are sent, in one particular scenario, from the master controller to the digital state machine in FIG. 3.

FIG. 6B shows a set of equations that calculate the efficiency by which commands are sent, in the same scenario as in FIG. 6A, using the master controller and digital state machine in FIG. 5.

FIG. 6C shows a set of equations that calculate the efficiency by which commands are sent, in two more scenarios, from the master controller to the digital state machine in FIG. 3.

FIG. 8A shows a set of equations that calculate the efficiency by which the command chain of FIG. 7 is sent, in two additional scenarios, from the master controller to the digital state machine in FIG. 3.

FIG. 8B shows a set of equations that calculate the efficiency by which the command chain of FIG. 7 is sent, in the same scenarios as in FIG. 8A, using the master controller and digital state machine in FIG. 5.

DETAILED DESCRIPTION

Figure 3:
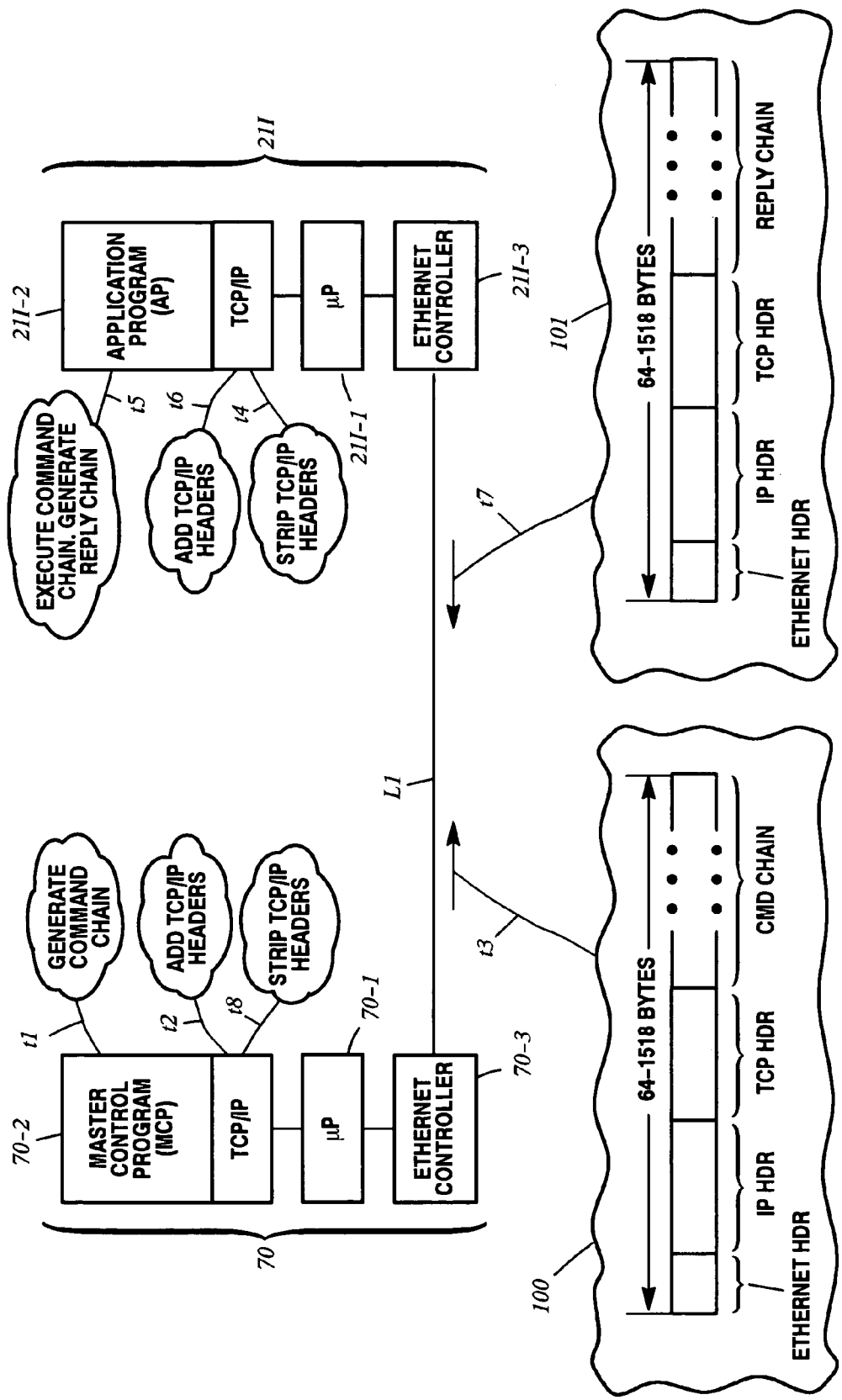
FIG. 3 shows the internal structure of the master controller and one digital state machine in FIG. 2, as well as a time sequence of events by which they interact accordance with the present invention.

To begin this Detailed Description, reference should now be made to FIG. 3. In that figure, one preferred internal structure for the master controller 70 is shown, and one preferred internal structure for the digital state machine 21I is shown. In addition, FIG. 3 also shows one time sequence of events during which the master controller 70 and the digital state machine 21I interact in accordance with the present invention.

In FIG. 3, the master controller 70 is comprised of a microprocessor 70-1, a memory 70-2, and an ethernet controller 70-3. Stored in the memory 70-2 is a master control program (MCP), a transmission control protocol program (TCP), and an internet protocol program (IP). The TCP program constitutes the transport layer of the TCP/IP standard, and the IP program constitutes the internet layer of the TCP/IP standard.

Similarly in FIG. 3, the digital state machine 21I is comprised of a microprocessor 21I-1, a memory 21I-2, and an ethernet controller 21I-3. Stored in the memory 21I-2 is an application program (AP), a transmission control protocol program (TCP), and an internet protocol program (IP). Here again, the TCP program constitutes the transport layer of the TCP/IP standard, and the IP program constitutes the internet layer of the TCP/IP standard. The ethernet controller 21I-3 and the ethernet controller 70-3 are intercoupled by a signal line L1.

Figure 4:
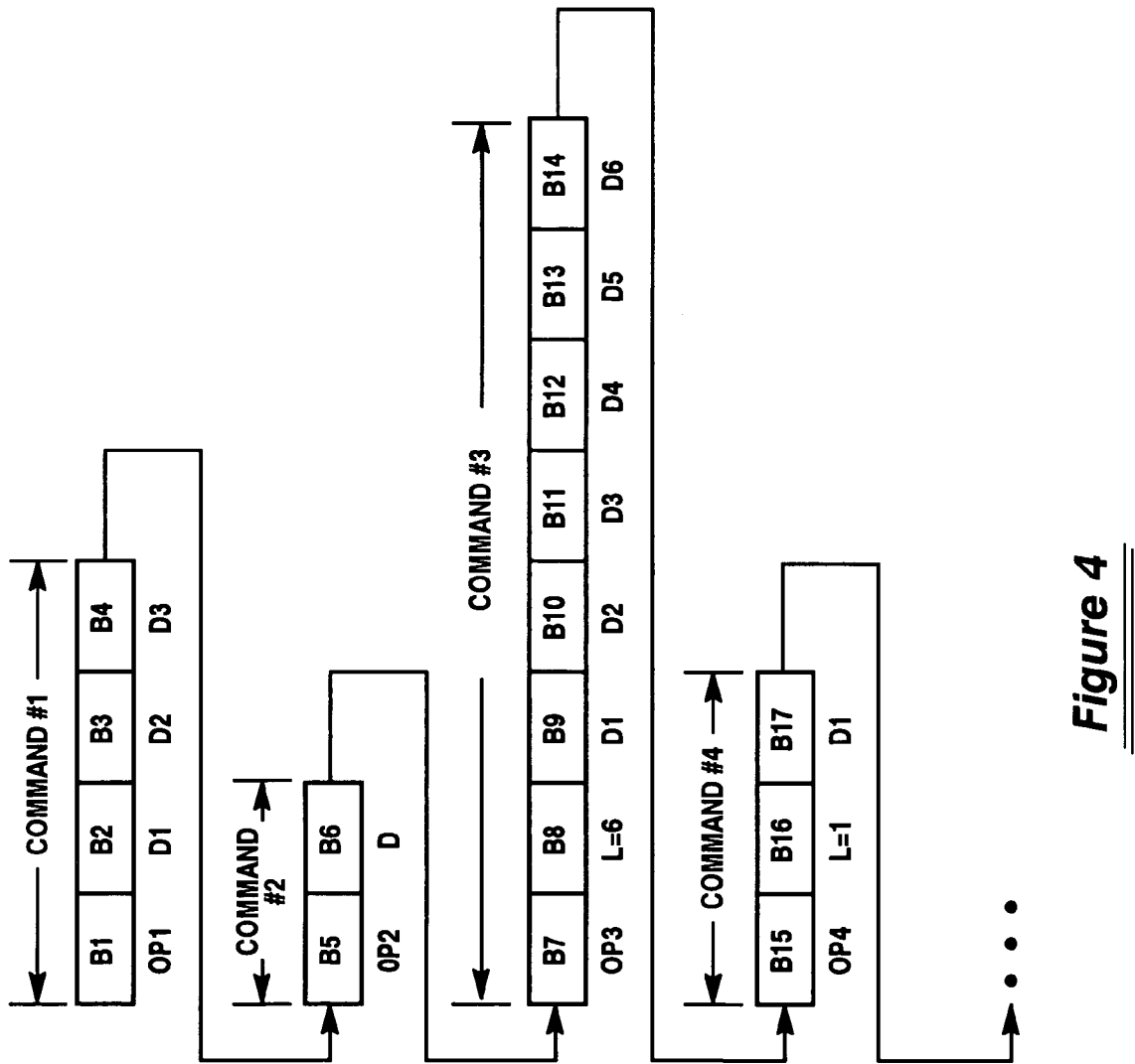
FIG. 4 shows various details of a command chain which is sent from the master controller in FIG. 3 to the digital state machine in FIG. 3, in accordance with the present invention.

In operation, the master controller 70 and the digital state machine 21I interact by a sequence of events that occur at times t1–t8. Initially, at time t1, the master controller 70 generates a command chain in which multiple commands for the digital state machine 21I are concatenated together in a series. An example of this command claim is shown in FIG. 4 and will be described shortly. The generation of this command chain is performed by the microprocessor 70-1 under the direction of the master control program in the memory 70-2.

Thereafter, at time t2, the master control program passes the command chain, as a single payload data packet, to the transmission control protocol program in the master controller 70. In response, the transmission control protocol program adds a TCP header to the command chain, and passes the resulting structure to the internet protocol program in the master controller 70. Then the internet protocol program adds an IP header to the structure which it received from the transmission control program, and passes the result to the ethernet controller 70-3.

Thereafter, the ethernet controller 70-3 adds an ethernet header to the structure which it received from the internet protocol program. This results in the command chain being embedded in a layered TCP/IP/ethernet format 100 as shown in FIG. 3. The command chain in the layered format 100 is sent at time t3 by the ethernet controller 70-3 to the ethernet controller 21I-3.

When the ethernet controller 21I-3 receives the command chain in the layered format 100, it strips off the ethernet header and passes the resulting structure to the internet protocol program in the digital state machine 21I. Then the internet protocol program strips off the IP header and passes the resulting structure to the transmission control program in the digital state machine 21I. Then the transmission control program strips off the TCP header and passes the command chain to the application program. The stripping of the IP header and the TCP header occurs at time t4.

Thereafter, at time t5, the commands in the command chain are executed by the digital state machine 21I. To execute any one command, the application program parses the command to determine which particular operation is to be performed, and then the application program causes the microprocessor 21I-1 to carry out that operation.

Some commands in the chain may be of a type that produce a result which needs to be reported back to the master controller 70. Other commands in the chain may be of a type that produce no result which needs to be reported back. The results from each command that do need to be reported back are concatenated together by the application program to thereby generate a reply chain. The results in the reply chain can be concatenated in any predetermined order, but preferably they are concatenated in the same order that they are generated by the commands in the corresponding command chain. This reply chain is sent back to the master controller after the command chain is executed.

To send the reply chain back to the master controller 70, the application program passes the reply chain, as a single payload data packet, to the transmission control protocol program in the digital state machine 21I. In response, the transmission control program adds a TCP header to the reply chain, and passes the resulting structure to the internet protocol program in the digital state machine 21I. Then the internet protocol program adds an IP header to the structure which it received from the transmission program, and passes the result to the ethernet controller 21I-3. The adding of the TCP header and IP header occurs at time t6.

Thereafter, the ethernet controller 21I-3 adds an ethernet header to the structure which it received from the internet protocol program. This results in the reply chain being embedded in a layered TCP/IP/ethernet format 101 as shown in FIG. 3. The reply chain in the layered format 101 is sent at time t7 by the ethernet controller 21I-3 to the ethernet controller 70-3.

When the ethernet controller 70-3 receives the reply chain in the layered format 101, it strips off the ethernet header and passes the resulting structure to the internet protocol program in the master controller 70. Then the internet protocol program strips off the IP header and passes the resulting structure to the transmission control program in the master controller 70. Then the transmission control program strips off the TCP header and passes the reply chain to the master control program. The stripping of the IP header and TCP header occurs at time t8.

Figure 1:
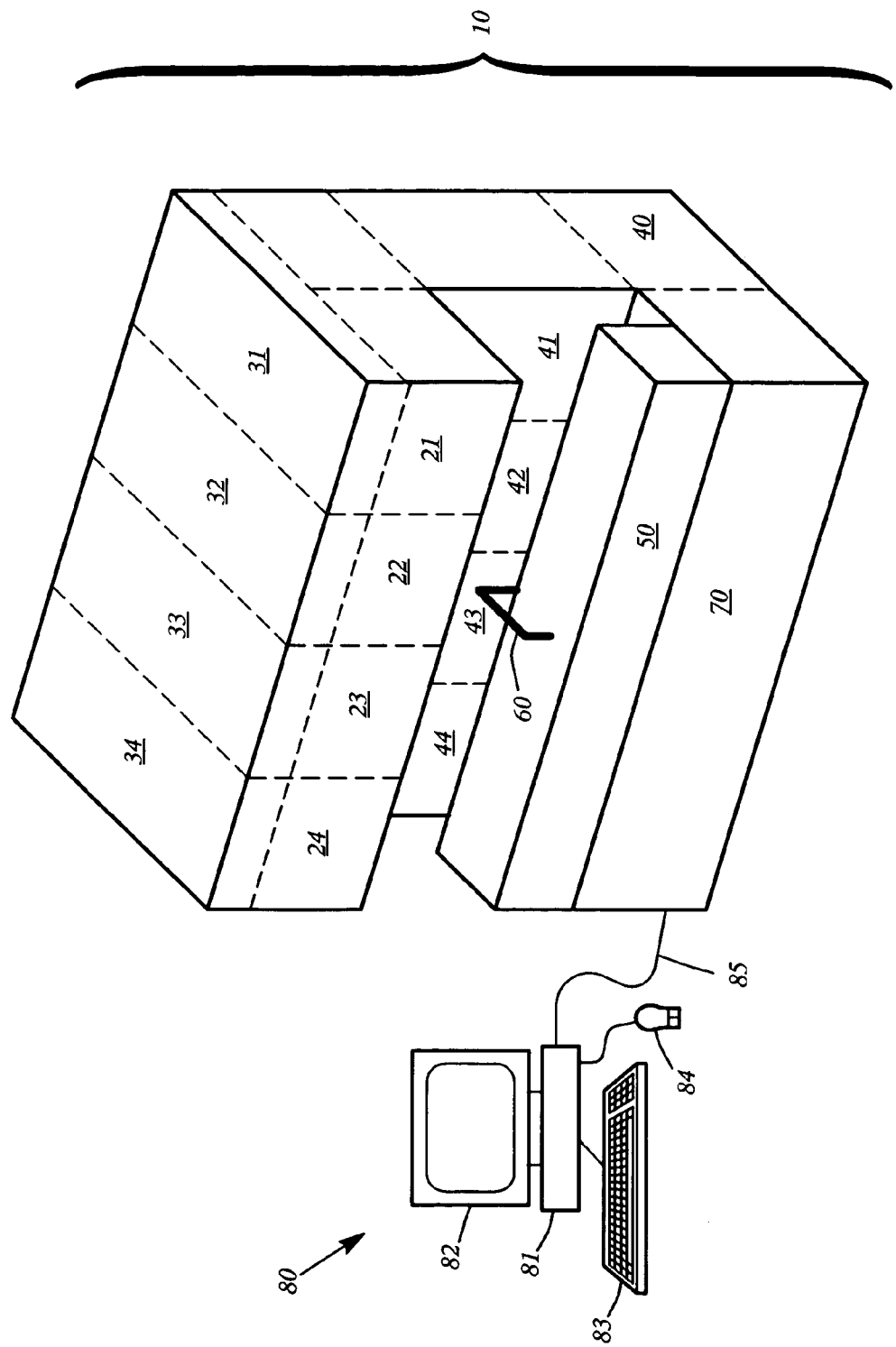
FIG. 1 shows a system for testing IC-chips in which a master controller controls the operation of four digital state machines by a method that employs the present invention.
Figure 2:
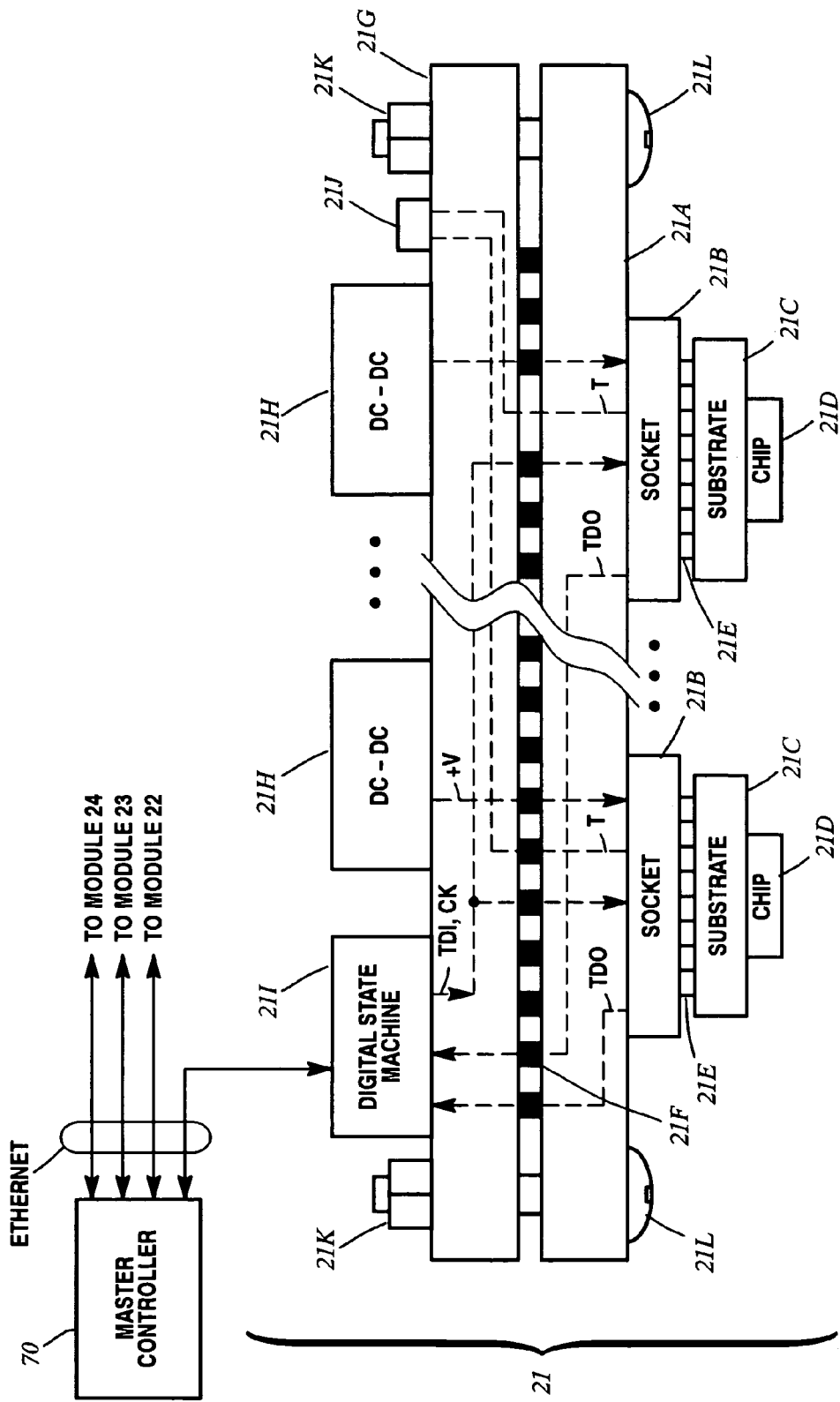
FIG. 2 shows how the master controller and digital state machines are coupled together, within the system of FIG. 1.

To completely test the integrated circuit chip 21D which is shown in FIG. 2, the time sequence of events that occur at times t1–t8 in FIG. 3 will usually be repeated dozens of times. For example, a single command chain may include all of the commands that are needed to send one particular bit stream to the FIG. 2 chip 21D, and the corresponding reply chain may indicate whether or not the chip 21D responded properly to that particular bit steam. In that case, to test the chip 21D with one-hundred different bit streams, the sequence of events at times t1–t8 would be repeated one-hundred times.

An example which illustrates the internal structure of a typical command chain is shown in FIG. 4. There, the first command occupies four bytes B1–B4 in the chain. Byte B1 is an operation code OP1 which specifies one particular operation and indicates that the command is four bytes long. Three bytes of data D1–D3 always follow the operation code OP1.

The second command in the FIG. 4 example occupies two bytes B5–B6 in the chain. Byte B5 is an operation code OP2 which specifies a second operation and indicates that the command is two bytes long. One byte of data D1 always follows the operation code OP2.

The third command in the FIG. 4 example occupies eight bytes B7–B14 in the chain. Byte B7 is an operation code OP3 which specifies a third operation and indicates that the command has a variable length. The next byte B6 specifies the number of data bytes that follow in the command.

The fourth command in the FIG. 4 example occupies three bytes B15–B17 in the chain. Byte B15 is an operation code OP4 which specifies a fourth operation and indicates that the command has a variable length. The next byte B16 specifies the number of data bytes that follow in the command.

Preferably, each command chain contains many more commands than just the four example commands that are shown in FIG. 4. These additional commands are indicated by the series of dots that follow byte B17 in FIG. 4.

In the layered TCP/IP/internet format 100 of FIG. 3, the maximum number of bytes is limited by the TCP/IP/ethernet standards to one-thousand-five-hundred-eighteen. Thus, if the TCP/IP/internet headers occupy a total of fifty-four bytes, then the longest command chain will contain one-thousand-four-hundred-sixty-four bytes of commands. Further, if the average number of bytes per command in a command chain is six, then the longest command chain will contain two-hundred-forty-four commands.

Figure 5:
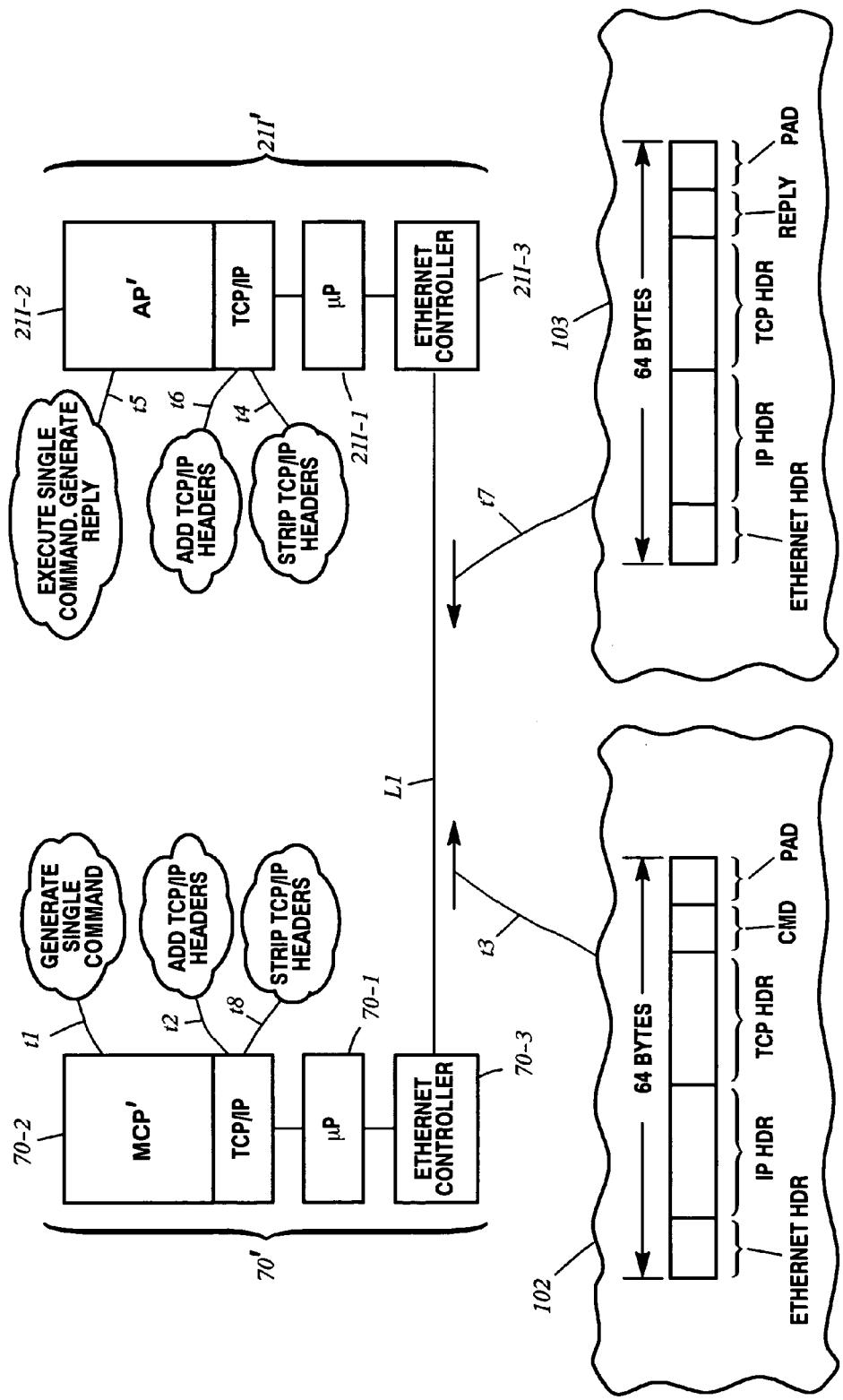
FIG. 5 shows certain changes in the structure and operation of the master controller and digital state machine of FIG. 2, for the purpose of comparison to the present invention.

For comparison purposes, FIG. 5 shows an alternative to the FIG. 3 process of sending the command chains 100 and the reply chains 101. In FIG. 5, reference numeral 70' identifies a master controller which is the same as the master controller 70 of FIG. 3 except that the master controller 70' includes a different master control program MCP'. Also in FIG. 5, reference numeral 21I' identifies a digital state machine which is the same as the digital state machine 21I of FIG. 3 except that the digital state machine 21I' includes a different application program AP'.

In operation, the FIG. 5 master control program MCP' directs the microprocessor 70-1 to send just one command at a time to the digital state machine 21I'. This one command is sent on the signal line L1 in the layered TCP/IP/ethernet format as indicated in FIG. 5 by reference numeral 103.

Similarly, the FIG. 5 application program AP' directs the microprocessor 21I-1 to send the result from just one command at a time to the master controller 70'. This one result is sent on the signal line L1 in the layered TCP/IP/ethernet format as indicated in FIG. 5 by reference numeral 104. In FIG. 5, the sequence of events which is shown at times t1–t8 is repeated once for each command that is in the command chain in FIG. 3.

Now, a numerical comparison will be made between the efficiency of the FIG. 3 transmissions which use the layered TCP/IP/ethernet formats 100 and 101, and the efficiency of the FIG. 5 transmissions which use the layered TCP/IP/ethernet formats 102 and 103. This comparison is made by equations 1–4 in FIG. 6A, equations 10–11 in FIG. 6B, and equations 20–21 in FIG. 6C.

To make this comparison, a hypothetical command chain is initially used which contains just five commands. This is stated by equation 1 in FIG. 6A. Also in this command chain, the average number of bytes per command is six. This is stated by equation 2. Further when this command chain is sent in the layered TCP/IP/ethernet format, the TCP header is twenty bytes long; the IP header is twenty bytes long; and the ethernet header is fourteen bytes long. This is stated by equation 3.

Next, equation 4 calculates the efficiency with which the command chain of equations 1–2 is sent by the master controller 70 in FIG. 3 to digital state machine 21I. In equation 4, the numerator term of "(6)(5)" is the total number of bytes in the command chain. Also in equation 4, the denominator term of "20+20+14+(6)(5)" is the total number of bytes in the layer TCP/IP/ethernet format 100 which includes the command chain. From equation 4, the efficiency with which the command chain is sent is calculated to be 35.7%.

Suppose now that each command in the command chain of equation 1 and 2 is sent from the master controller 70' in FIG. 5 to the digital state machine 21I'. When that is done, the length of the TCP/IP/ethernet header in the layered format 102 will still be (20+20+14) bytes as given by equation 3, and the length of the average command will still be six bytes as given by equation 2. That yields a total of sixty bytes.

But the TCP/IP/ethernet standard requires a minimum of sixty-four bytes total for the headers plus the accompanying payload data packet. So "pad" bytes must be added to each payload data packet. The average number of pad bytes is given by equation 10 in FIG. 6B.

Next, equation 11 calculates the efficiency with which an average command, in the command chain of equations 1–2, is sent by the master controller 70' in FIG. 5 to the digital state machine 21I'. In equation 11, the numerator term of "(6)(4)" is the average number of bytes for each command that is sent in the layered TCP/IP/ethernet format 102 of FIG. 5. Also in equation 11, the denominator term of "(6+4+20+20+14) is the total number of bytes in the TCP/IP/ethernet format 102. From equation 11, the efficiency with which an average command is sent, in the format 102, is only 9.4%.

Recall now that by equation 2, the total number of commands in the command chain was set to only five. Preferably, however, the number of commands in one command chain is much larger. In FIG. 6C, equation 20 sets ten commands into one command chain. For that case, the efficiency of sending the command chain in the layered TCP/IP/ethernet format 100 of FIG. 3 is calculated by equation 21 to be 52.6%. By comparison, the efficiency of sending an average command in the chain via the layered TCP/IP/ethernet format 102 of FIG. 5 remains at 9.4%.

Similarly, in FIG. 6C, equation 22 sets twenty commands into one command chain. For that case, the efficiency of sending the command chain in the layered TCP/IP/ethernet format 100 of FIG. 3 is calculated by equation 23 to be 76.9%. By comparison, the efficiency of sending an average command in the chain via the layered TCP/IP/ethernet format 102 of FIG. 5 still remains at 9.4%.

Figure 7:
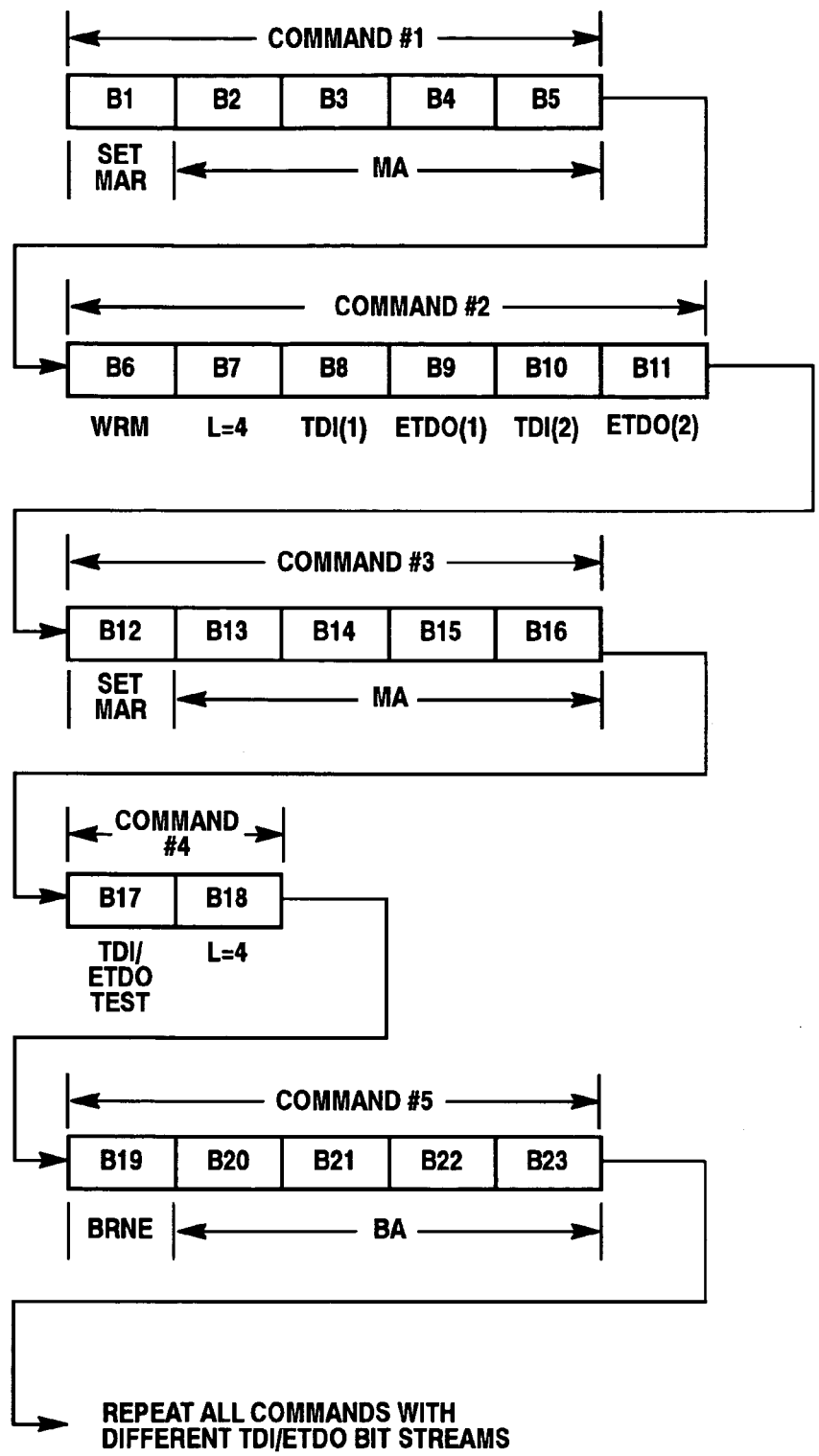
FIG. 7 shows various details of another command chain which is more specific than the FIG. 4 command chain.

Next, with reference to FIGS. 7, 8A, and 8B, the efficiency of transmitting another more specific command chain will be calculated. This particular command chain is shown in FIG. 7. There, the first command in the chain occupies bytes B1–B5; the second command occupies bytes B6–B11; the third command occupies bytes B12–B16; the fourth command occupies bytes B17–B18; and the fifth command occupies bytes B19–B23.

In FIG. 7, command #1 has an operation code in byte B1 which specifies that a memory address register, within the application program AP or AP', is to be set. The particular address which is to be set into the memory address register is specified by bytes B2–B5.

Command #2 in FIG. 7 has an operation code in byte B6 which specifies that a selectable number of bytes are to be written into the memory 21I-2 of FIG. 3 or 5. This selectable number is specified by byte B7, and it is followed by the actual bytes that are to be written.

As an example in FIG. 7, the number that is specified by byte B7 is four, and those four bytes constitute two separate bit streams. One bit stream is TDI, which is "test-data-in" for the chip 21D of FIG. 2. The other bit stream is ETDO, which is the "expected test-data-out" from the chip 21D. These two bit streams are interleaved byte-by-byte, and they are written into the memory 21I-2 beginning at the address which was previously set in the memory address register by command #1.

Command #3 in FIG. 7 resets the address in the memory address register back to the start of the bit streams which are written by command #2. This command #3 is the same as command #1.

Command #4 in FIG. 7 directs the microprocessor 21I-1, of FIG. 3 or 5, to test the chip 21D of FIG. 2 with the bit streams that were previously written into the memory 21I-2 by command #2. The operation code in byte B17 specifies that this is a TDI/ETDO type of test. In this test, the TDI bit stream is sent to the chip 21D; an output bit stream TDO is received from the chip 21D in response; and the ETDO bit stream is compared to the TDO bit stream. Byte B18 specifies the total number of bytes which are in the TDI/ETDO bit streams. The beginning address of those bit streams is in the memory address register as set by command #3.

Command #5 in FIG. 7 has an operation code in byte B19 which specifies that a branch should be taken if the TDO and ETDO bit streams are not equal. Such a miscompare indicates that the chip 21D has a defect. The branch address is specified in bytes B20–B23.

To fully test the chip 21D, that chip needs to be sent many different TDI bit streams. This is done by repeating the five commands that are shown in FIG. 7, multiple times, with each repetition specifying different TDI/ETDO bit patterns in command #2. This is indicated at the bottom of FIG. 7.

As one specific example, suppose that the five commands in FIG. 7 are repeated just ten times. This is done by equation 30 in FIG. 8A. In that case, the efficiency with which the entire command chain is sent from the master controller 70 in FIG. 3 in the layered TCP/IP/ethernet format 100 is calculated by equation 31 to be 80.9%.

In equation 31, the numerator term of "(23)(10)" is the total number of bytes in the command chain. The denominator term of "20+20+14+(23)(10)" is the total number of bytes in the command chain plus the TCP/IP/ethernet headers as previously given by equation 3 in FIG. 6A.

As another specific example, suppose that the five commands in FIG. 7 are repeated twenty times. This is done by equation 32 in FIG. 8A. In that case, the efficiency with which the entire command chain is sent from the master controller 70 in FIG. 3 in the layered TCP/IP/ethernet format 100 is calculated by equation 34 to be 89.4%.

By comparison, equations 41–43 of FIG. 5B calculate the efficiency of sending an average command, in the command chains of equations 30 or 32, from the master controller 70' of FIG. 5 with the layered TCP/IP/ethernet format 102. The total number of bytes in this average command is determined by equation 41 to be 4.6 bytes. When this average command is sent in the layered TCP/IP/ethernet format 102, the corresponding number of pad bytes is 5.4. This is calculated by equation 42. Then, equation 43 calculates the efficiency of sending the average command, with the pad bytes in the layered TCP/IP/ethernet format 102 of FIG. 5. This efficiency is only 7.1%.

In addition to improved efficiency, the method of FIG. 3 also has three other benefits over the method of FIG. 5. The first additional benefit is that with the method of FIG. 3, the master controller 70 is free to perform any desired task while the digital state machine 21I is executing all of the commands in the command chain which it is sent. This is important where the master controller 70 is servicing multiple digital state machines 21I simultaneously. By comparison, in FIG. 5, the master controller 70' must always be waiting to receive a result and send the next command to the digital state machine 21I'.

The second additional benefit with the method of FIG. 3 is that the digital state machine 21I is able to execute the commands that it receives without any delay between two consecutive commands. This is important where consecutive commands must be completed in a certain time interval. By comparison, in FIG. 5, digital state machine 21I' must wait for the master controller 70' between any two consecutive commands.

The third additional benefit with the method of FIG. 3 is that the command chain which is sent to the digital state machine 21I can include one or more conditional branch instructions. By these commands, the digital state machine is able to selectively branch from one command to any other command in the command chain, based on the state of certain conditions. By comparison, in the method of FIG. 5, the digital state machine 21I' receives only one command at a time, so there is no other command to branch to.

One preferred embodiment of a chip testing system, and its preferred method of operation, have now been described in detail. In addition, however, various minor changes can be made to those details without departing from the gist of the present invention.

For example, in FIG. 3, consider the transmission control protocol program (TCP) and the internet protocol program (IP) as shown in memory 70-2 and memory 21I-2. Those TCP/IP programs can be implemented as part of an operating system (not shown) in the memories 70-2 and 21I-2 for the microprocessors 70-1 and 21I-1. One such standard operating system is called "Windows" from Microsoft Corporation.

As another example, in FIG. 3, consider the ethernet controllers 70-3 and 21I-3. Those controllers can be implemented as desired so long as they meet the IEEE standard called 802.3. One particular implementation is achieved with a part numbered LAN91C9111 from SMSC Corporation.

As another example, the ethernet controllers 70-3 and 21I-3 of FIG. 3 can be replaced with controllers which implement a different type of bit serial communication. In particular, the ethernet controllers 70-3 and 21I-3 can be replaced with RS232 controllers. With this modification, the command chain which is sent in the layered format 100 in FIG. 3 will have an RS232 header instead of an ethernet header.

In more general terms, the command chain is sent in FIG. 3 as a single payload data packet which is embedded in a layered TCP/IP/network format. Ethernet and RS232 are just two specific examples of the "network" in this layered format.

As still another example, the command chain itself which is embedded in the layered TCP/IP/network format, can have many different structures. The structures shown in FIGS. 4 and 7 are just two specific examples. Preferably, the total number of bytes in the command chain is at least half as many as the total number of bytes in the TCP/IP/network headers. This constraint can be met by generating a minimum number of commands, such as five or ten, in each command chain. This constraint can also be met by generating a minimum number of command bytes, such as thirty, in each command chain.

Accordingly, it is to be understood that the present invention is not limited to just the details of the preferred system and its preferred method of operation, as shown in the drawings, but is defined by the appended claims.

What is claimed is:

1. A method of controlling the operation of a digital state machine from a master controller in an IC-chip testing system, said method including the steps of:
    generating, in said master controller, a command chain in which multiple commands for said digital state machine are concatenated together in a series;
    sending, from said master controller to said digital state machine over a signal line, a single payload data packet embedded in a layered TCP/IP/network format, where -a) said layered TCP/IP/network format includes multiple headers, b) said single payload data packet includes said command chain, and c) said command chain is at least half as long as said multiple headers; and,
    executing, in said digital state machine, said commands in said command chain.

2. A method according to claim 1 wherein said command chain includes at least five separate commands for said digital state machine.

3. A method according to claim 1 wherein said command chain includes at least ten separate commands for said digital state machine.

4. A method according to claim 1 wherein said command chain is at least thirty bytes in length.

5. A method according to claim 1 wherein said layered TCP/IP/network format is a TCP/IP/ethernet format.

6. A method according to claim 1 wherein said layered TCP/IP/network format is a TCP/IP/RS232 format.

7. A method according to claim 1 and further including the step of performing tasks in said master controller, other than simply waiting for a response from said digital state machine, while said digital state machine is performing said executing step.

8. A method according to claim 1 and further including the step of performing said executing step with no interruptions, in said digital state machine, between any two consecutive commands in said command chain.

9. A method according to claim 1 and further including the steps, by said digital state machine, of detecting a conditional branch command within said command chain, and selectively executing a subset of said commands in said command chain in response to said conditional branch command.

10. A method according to claim 1 and further including the step by said digital state machine of sending, from said digital state machine to said master controller over said signal line, a second payload data packet embedded in said layered TCP/IP/network format with said second payload data packet including respective responses for particular commands in said command chain.

* * * * *